(12) United States Patent
Grip

(10) Patent No.: US 7,372,523 B2
(45) Date of Patent: May 13, 2008

(54) DISPLAY APPARATUSES HAVING LAYERED LIQUID CRYSTAL DISPLAYS

(75) Inventor: Martin Grip, Malmo (SE)

(73) Assignee: Sony Ericsson Mobile Communications AB (SE)

( * ) Notice: Subject to any disclaimer, the term of this patent is extended or adjusted under 35 U.S.C. 154(b) by 437 days.

(21) Appl. No.: 10/792,420

(22) Filed: Mar. 3, 2004

(65) Prior Publication Data
US 2005/0195342 A1 Sep. 8, 2005

(51) Int. Cl.
G02F 1/1347 (2006.01)
(52) U.S. Cl. .............................. 349/74; 349/75; 349/76
(58) Field of Classification Search ............ 349/74–76
See application file for complete search history.

(56) References Cited

U.S. PATENT DOCUMENTS 5,600,459 A * 2/1997 Roy et al. ..................... 349/42
5,841,492 A * 11/1998 Iwauchi et al. ............... 349/74
5,952,992 A * 9/1999 Helms ........................ 345/102
6,097,451 A * 8/2000 Palmer et al. ................ 349/14
6,184,951 B1 * 2/2001 Harrold et al. ............... 349/74
6,379,017 B2 * 4/2002 Nakabayashi et al. ...... 362/619
6,707,515 B1 * 3/2004 Ide et al. ...................... 349/74
6,788,360 B2 * 9/2004 Penterman et al. .......... 349/74

* cited by examiner

Primary Examiner—David Nelms
Assistant Examiner—Phu Vu
(74) Attorney, Agent, or Firm—Myers Bigel Sibley & Sajovec, P.A.

(57) ABSTRACT

Display apparatuses are provided that includes a light source, a first liquid crystal display on the light source, and a second liquid crystal display on the first liquid crystal display. The first liquid crystal display is configured to allow a variable amount of light transmission based on a first control signal. The second liquid crystal display is configured to allow a variable amount of light transmission based on a second control signal.

15 Claims, 2 Drawing Sheets

Figure 3

| Second Front Polarizer 320 |
| --- |
| Fourth Substrate With Electrodes 318 |
| Second Liquid Crystal Layer 316 |
| Third Substrate With Electrodes 314 |
| Second Rear Polarizer 312 |
| First Front Polarizer 310 |
| Second Substrate With Electrodes 308 |
| First Liquid Crystal Layer 306 |
| First Substrate With Electrodes 304 |
| First Rear Polarizer 302 |
| Light Source 102 |

DISPLAY APPARATUSES HAVING LAYERED LIQUID CRYSTAL DISPLAYS

BACKGROUND OF THE INVENTION

The present invention relates to displays, and more particularly, to liquid crystal displays (LCDs).

Liquid crystal displays are commonly used in, for example, laptop computers, mobile telephones, personal digital assistants (PDAs) and, increasingly, in televisions. The use of LCDs in these devices is common because, for example, LCDs may be thinner and lighter and may draw less power than, for example, cathode ray tubes (CRTs), and may be less expensive than plasma displays or light emitting diode (LED) displays, such as organic LED displays and/or polymeric LED displays. LCDs are typically backlit by a light source, for example, by a light emitting diode (LED) or an electroluminescent (EL) panel. Backlit LCDs displays may operate well in poorly lit environments but may not function adequately in bright environments, for example, in brightly lit office environments or sunlight. LCDs may also provide less contrast differential between bright and dark areas than CRTs, plasma displays, and LED displays.

SUMMARY OF THE INVENTION

Embodiments of the present invention provide a display apparatus that includes a light source, a first liquid crystal display on the light source, and a second liquid crystal display on the first liquid crystal display. The first liquid crystal display is configured to allow a variable amount of light transmission based on a first control signal. The second liquid crystal display is configured to allow a variable amount of light transmission based on a second control signal.

In some further embodiments of the present invention, one of the first and second liquid crystal displays includes a grayscale liquid crystal display, and the other one of the first and second liquid crystal displays includes a color liquid crystal display. Alternatively, both of the first and second liquid crystal displays can include the same one of a grayscale liquid crystal display or a color liquid crystal display. The first and second liquid crystal displays can each include a twisted nematic liquid crystal display or a super twisted nematic liquid crystal display, and can each include a passive matrix liquid crystal display or an active matrix liquid crystal display. The first liquid crystal display can be between the light source and the second liquid crystal display, or the second liquid crystal display can be between the light source and the first liquid crystal display.

The display apparatus can further include a display circuit that is configured to generate the first control signal to vary the amount of light transmission of the first liquid crystal display. They can be configured to generate the first control signal based on the amount of light transmission of the second liquid crystal display. For example, the display circuit can be configured to increase light transmission through the first liquid crystal display when an amount of light transmission through the second liquid crystal display satisfies a threshold value. Alternatively, the display circuit can be configured to generate the first control signal independent of the amount of light transmission of the second liquid crystal display.

The display apparatus can further include a light sensor that is configured to generate an ambient light signal based on intensity of ambient light. The display circuit can be configured to generate the first control signal to vary the amount of light transmission through the first liquid crystal display based on the ambient light signal. The first liquid crystal display can be configured to operate in at least a first state having a first amount of light transmission and a second state having a second amount of light transmission that is greater than the first amount of light transmission. The display circuit can be configured to generate the first control signal to change the first liquid crystal display between the first and second states.

The light source can include one or more light emitting diodes, fluorescent tubes, incandescent bulbs, and/or electroluminescent panels.

The second liquid crystal display can include separately addressable pixels that are configured to display images by varying the amount of light transmission of the pixels based on the second control signal. The first liquid crystal display can be configured to uniformly vary the amount of light transmission passing through it based on the first control signal. Alternatively, the first liquid crystal display can include separately addressable pixels that may be controlled independently of, or based on, the pixels in the second liquid crystal display. Accordingly, the first and second liquid crystal displays may be controlled to display the same or different images.

In yet some further embodiments of the present invention, the first liquid crystal display can include a first substrate with electrodes, a first liquid crystal layer on the first substrate, and a second substrate with electrodes on the first liquid crystal layer. The second liquid crystal display can include a second liquid crystal layer on the second substrate, and a third substrate with electrodes on the second liquid crystal layer. A rear polarizer can be between the light source and the first substrate, and a front polarizer can be on the third substrate.

In yet some further embodiments of the present invention, the first liquid crystal display can include a first rear polarizer, a first substrate with electrodes on the first rear polarizer, a first liquid crystal layer on the first substrate, a second substrate with electrodes on the first liquid crystal layer, and a first front polarizer on the second substrate. The second liquid crystal display can include a second rear polarizer, a third substrate with electrodes on the second rear polarizer, a second liquid crystal layer on the third substrate, a fourth substrate with electrodes on the second liquid crystal layer, and a second front polarizer on the fourth substrate.

BRIEF DESCRIPTION OF THE DRAWINGS

FIG. 3 is a cross sectional view of a display according to some other embodiments of the present invention.

DETAILED DESCRIPTION

Figure 1:
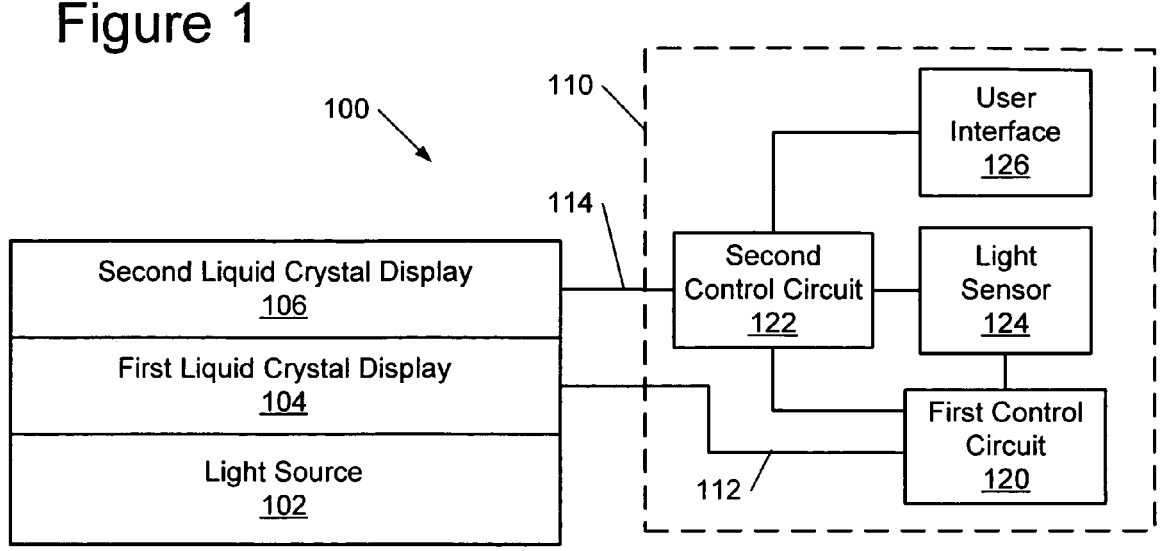
FIG. 1 is a cross sectional view of a display having layered liquid crystal displays and a block diagram of a display control circuit according to various embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Furthermore, relative terms such as overlying may be used herein to describe one layer or regions relationship to another layer or region as illustrated in the Figures. It will be understood that these terms are intended to encompass different orientations of the device in addition to the orientation depicted in the Figures. For example, if the device in the Figures is turned over, layers or regions described as "overlying" other layers or regions would now be oriented "below" or "underlying" these other layers or regions. The term "overlying" is intended to encompass both overlying and underlying in this situation. Like numbers refer to like elements throughout.

It will be understood that although the terms first and second are used herein to describe various elements or modes of operation, these elements or modes of operation should not be limited by these terms. These terms are only used to distinguish one element or mode of operation from another element or mode of operation. Thus, for example, a first liquid crystal display (LCD) discussed below could be termed a second LCD, and similarly, a second LCD may be termed a first LCD without departing from the teachings of the present invention. The term "picture" is used herein to refer to any form of text, graphic, or other image that may be displayed by a LCD.

Referring to FIG. 1, a display apparatus 100 includes a light source 102, a first LCD 104, and a second LCD 106 according to some embodiments of the present invention. The first and second LCDs 104 and 106 are layered on the light source 102 so that light from the light source 102 can pass through them. The display apparatus 100 can also include a display circuit 110 that generates first and second control signals 112 and 114. The first LCD 104 is configured to allow a variable amount of light transmission based on the first control signal 112. The second LCD 106 is configured to allow a variable amount of light transmission based on the second control signal 114. The first LCD 104 and/or the second LCD 106 may be a color LCD, a grayscale LCD, a passive matrix LCD such as a twisted nematic LCD or a super twisted nematic LCD, or a active matrix LCD such as a thin film transistor (TFT) LCD or a thin film diode (TFD) LCD. Although two control signals 112 and 114 are shown for illustration purposes, a single control signal or more than two control signals may be substituted therefor.

The light source 102 may be a high brightness light source such as, for example, a point light source or a panel light source. If a point light source, for example, light emitting diode(s) (LEDs) or fluorescent tube(s) or incandescent bulb(s), is used, a diffuser may be used to evenly distribute the point light source across the liquid crystal display. A panel light source may be, for example, an electroluminescent (EL) panel. By using a high brightness light source, the display apparatus 100 can generate bright pictures, such as for use in high ambient light conditions, and/or to generate high brightness in local areas of the display apparatus 100, such as to reproducing sun light, flame, or another bright light source in a picture.

The two layered LCDs 104 and 106 can be used to provide high contrast between bright and dark areas of displayed pictures and/or to vary the overall brightness of the display apparatus 100. The display circuit 110 controls the amount of light transmission through the first LCD 104, via the first control signal 112, to vary the amount of light that enters the second LCD 106. The display circuit 110 controls the second LCD 106, via the second control signal 114, to render a picture therein. The display circuit 110 may use an address or sequence of addresses to vary the light transmission of individual bit locations in the second LCD 106 to render the picture.

According to some embodiments of the invention, the display circuit 110 controls the first LCD 104 to increase or decrease the transmission of light from the light source 102 to defined areas of the second LCD 106. For example, the contrast of brightness between two areas of the second LCD 106 can be increased by varying the light transmission of the corresponding adjacent two areas of the first LCD 104. In particular, the display circuit 110 may vary the light transmission of bit locations of an area of the first LCD 104 to increase or decrease the brightness of corresponding adjacent bit locations of the second LCD 106. In this manner, the display apparatus 100 may provide increased contrast between bright and dark areas so as to reproduce, for example, a flame in a dark room or car lights at night.

According to some embodiments of the invention, the amount of light transmission through the first LCD 104 is not varied until the amount of light transmission in an area of the second LCD 106 satisfies a threshold amount. For example, when the light transmission of an area of the second LCD 104 approaches a maximum or threshold amount, the display circuit 110 further increases the brightness of light through that area by increasing the amount of light transmitted through a corresponding adjacent area of the first LCD 104. In some other embodiments of the invention, the amount of light transmission through the first LCD 104 is varied independent of the amount of light transmission through the second LCD 106.

According to some other embodiments of the invention, the display circuit 110 controls the amount of light passing through the first LCD 104 to uniformly increase or decrease the amount of light provided to the second LCD 106 and, thereby, the brightness of the display apparatus 100. The display circuit 110 may sense ambient light and/or an input signal from a user and, based thereon, vary the amount of light transmission of the first LCD 104. Thus, for example, in high ambient light conditions, the first LCD 104 can be used to uniformly increase the brightness of the display apparatus 100, and in low ambient light conditions, the first LCD 104 can be used to uniformly decrease the brightness of the display apparatus 100. To uniformly vary the amount of light transmission through the first LCD 104, the display circuit 110 may address larger pixel areas than are addressed in the second LCD 106 to render a picture, and may be, for example, configured to only vary the brightness of the entire first LCD 104.

Although some embodiments of the invention have been described above in which the second LCD 106 is configured to render a picture and the first LCD 104 is configured to vary the brightness of the second LCD 106, according to yet other embodiments of the present invention, the first and second LCDs 104 and 106 may be switched so that the described second LCD 106 is between the light source 102 and the described first LCD 104.

According to yet further embodiments of the present invention, the display circuit 110 includes first and second control circuits 120 and 122, a light sensor 124, and a user interface 126. The first and second control circuits 120 and 122 respectively generate the first control signal 112 and the second control signal 114 to respectively vary the amount of light transmission of the first LCD 104 and the second LCD 106. The first control circuit 120 may operate independently of the second control circuit 122, or it may generate the first control signal 112 based on signals from the second control circuit 122 which may indicate, for example, the brightness of the second LCD 106. The light sensor 124 is configured to sense intensity of ambient light and to generate a control signal responsive thereto. The light sensor 124 may be, for example, a phototransistor and/or a photodiode and may be located close to the first and second LCDs 104 and 106 to sense ambient light impendent thereon. The user interface 126 may include a button, wheel, touch sensor, or other interface that is configured to receive a user's input and to generate a control signal responsive thereto. The first control circuit 120 and/or the second control circuit 120 my use the control signal from the light sensor 124 and/or the user interface 126 to vary the amount of light transmission of the first LCD 104 and/or the second LCD 106.

Figure 2:
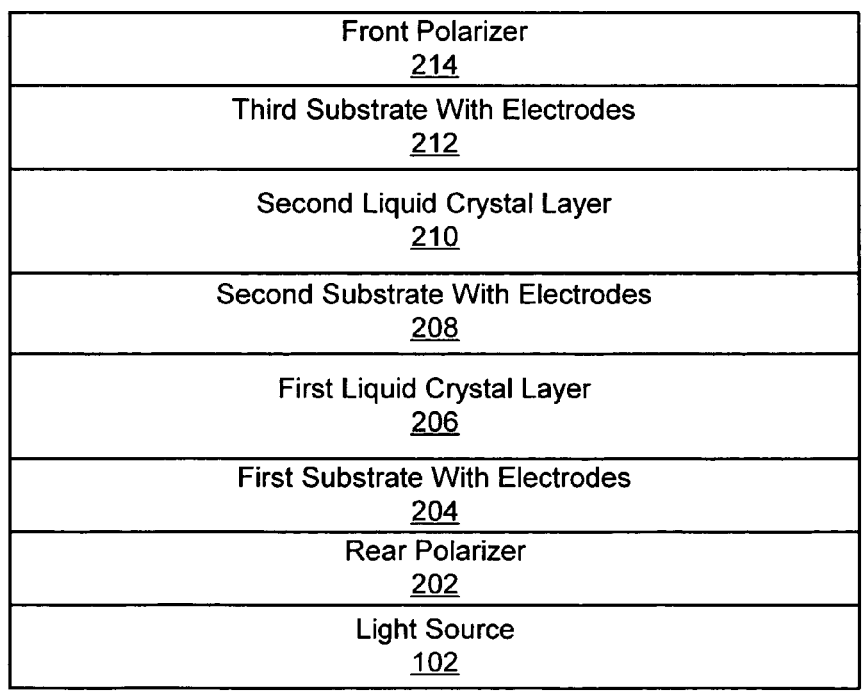
FIG. 2 is a cross sectional view of a display according to some embodiments of the present invention.

The layers that make up the light source 102 and the first and second LCDs 104 and 106 may overlie one other as illustrated in FIG. 2 according to some embodiments of the present invention. The layers form a stack of a light source 102, a rear polarizer 202, a first substrate 204, a first liquid crystal layer 206, a second substrate 208, a second liquid crystal layer 210, a third substrate 212, and a front polarizer 214. The first, second, and third substrates 204, 208, and 212 can be, for example, glass or plastic. The first, second, and/or third substrates 204 may have formed thereon a color filter array such as, for example, an array of red, green, and blue (RGB) pixels that are configured to display color images. The pair of first and second substrates 204 and 208 include electrodes that conduct the first control signal 112 to vary the electric field across the first liquid crystal layer 206 and, thereby, its light transmission. Similarly, the pair of second and third substrates 208 and 212 include electrodes that conduct the second control signal 114 to vary the electric field across the second liquid crystal layer 210 and, thereby, its light transmission. Accordingly, the amount of light from the light source 102 that exits the front polarizer 214 is dependent upon the light transmission of the first and second liquid crystal layers 206 and 210, which may be separately controlled using the electrodes on the substrates 204, 208, and 212.

FIG. 3 illustrates the layers that make up the light source 102 and the first and second LCDs 104 and 106 according to some other embodiments of the present invention. The layers form a stack of a light source 102, a first rear polarizer 302, a first substrate 304, a first liquid crystal layer 306, a second substrate 308, a first front polarizer 310, a second rear polarizer 312 a third substrate 314, a second liquid crystal layer 316, a fourth substrate 318, and a second front polarizer 320. The first, second, third, and/or fourth substrates 304, 308, 314, and 318 include, for example, glass, and can include a color filter array formed thereon. The first and second substrates 304 and 308 include electrodes that conduct the first control signal 112 to vary the electric field across the first liquid crystal layer 306 and, thereby, its light transmission. Similarly, the third and fourth substrates 312 and 318 include electrodes that conduct the second control signal 114 to vary the electric field across the second liquid crystal layer 316 and, thereby, its light transmission.

The layers illustrated in FIGS. 2 and 3 are for illustration purposes only, and embodiments of the invention are not to be limited thereto. Indeed, as will be appreciated by one having skill in the art in view of the description herein, other ordering of the layers may be provided, some layers may be eliminated, and additional layers may be added.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A display apparatus comprising:
a light source;
a first liquid crystal display on the light source, wherein the first liquid crystal display is configured to allow a variable amount of light transmission based on a first control signal;
a second liquid crystal display on the first liquid crystal display, wherein the second liquid crystal display is configured to allow a variable amount of light transmission based on a second control signal; and
a display circuit that is configured to generate the second control signal to separately address pixels on the second liquid crystal display to separately vary the amount of light transmission through individual ones of the addressed pixels for generating images, and configured to generate the first control signal to separately address pixels on the first liquid crystal display to vary the amount of light from the light source that is transmitted through individual ones of the addressed pixels to adjacent individual ones of addressed pixels of the second liquid crystal display based on the amount of light transmission through the adjacent individual ones of addressed pixels of the second liquid crystal display.

2. The display apparatus of claim 1, wherein one of the first and second liquid crystal displays comprises a grayscale liquid crystal display and the other one of the first and second displays comprises a color liquid crystal display.

3. The display apparatus of claim 1, wherein both of the first and second liquid crystal displays comprise the same one of a grayscale liquid crystal display or a color liquid crystal display.

4. The display apparatus of claim 1, wherein the first and second liquid crystal displays comprise a twisted nematic liquid crystal display or a super twisted nematic liquid crystal display.

5. The display apparatus of claim 1, wherein the first and second liquid crystal displays comprise a passive matrix liquid crystal display or an active matrix liquid crystal display.

6. The display apparatus of claim 1, wherein the first liquid crystal display is between the light source and the second liquid crystal display.

7. The display apparatus of claim 1, wherein the display circuit is configured to change the first control signal to increase light transmission through individual ones of the addressed pixels of the first liquid crystal display when an amount of light transmission through adjacent individual ones of the addressed pixels of the second liquid crystal display satisfy a threshold value.

8. The display apparatus of claim 1, further comprising a light sensor that is configured to generate an ambient light signal based on intensity of ambient light, and wherein the display circuit is configured to generate the first control signal to vary the amount of light transmission through the first liquid crystal display based on the ambient light signal.

9. The display apparatus of claim 1, wherein the first liquid crystal display is configured to operate in at least a first state having a first amount of light transmission and a second state having a second amount of light transmission that is greater than the first amount of light transmission, and wherein the display circuit is configured to generate the first control signal to change the first liquid crystal display between the first and second states.

10. The display apparatus of claim 1, wherein the light source comprises at least one light emitting diode.

11. The display apparatus of claim 1, wherein the light source comprises at least one fluorescent tube.

12. The display apparatus of claim 1, wherein the light source comprises at least one incandescent bulb.

13. The display apparatus of claim 1, wherein the light source comprises an electroluminescent panel.

14. The display apparatus of claim 1, wherein:
the first liquid crystal display comprises a first substrate with conductive electrodes, a first liquid crystal layer on the first substrate, and a second substrate with conductive electrodes on the first liquid crystal layer; and
the second liquid crystal display comprises a second liquid crystal layer on the second substrate, and a third substrate on the second, liquid crystal layer; and
further comprising a rear polarizer between the light source and the first substrate, and a front polarizer on the third substrate.

15. The display apparatus of claim 1, wherein:
the first liquid crystal display comprises a first rear polarizer, a first substrate with conductive electrodes on the first rear polarizer, a first liquid crystal layer on the first substrate, a second substrate with conductive electrodes on the first liquid crystal layer, and a first front polarizer on the second substrate; and
the second liquid crystal display comprises a second rear polarizer, a third substrate with conductive electrodes on the second rear polarizer, a second liquid crystal layer on the third substrate, a fourth substrate with conductive electrodes on the second liquid crystal layer, and a second front polarizer on the fourth electrode.

* * * * *